United States Patent
Fröhlich et al.

(10) Patent No.: US 10,523,084 B2
(45) Date of Patent: Dec. 31, 2019

(54) COOLING SYSTEM FOR AN ELECTRIC MACHINE

(71) Applicant: CONTINENTAL AUTOMOTIVE GMBH, Hannover (DE)

(72) Inventors: Holger Fröhlich, Berlin (DE); Robert Krause, Berlin (DE)

(73) Assignee: Vitesco Technologies GmbH, Hannover (DE)

( * ) Notice: Subject to any disclaimer, the term of this patent is extended or adjusted under 35 U.S.C. 154(b) by 108 days.

(21) Appl. No.: 15/898,602

(22) Filed: Feb. 18, 2018

(65) Prior Publication Data

US 2018/0248442 A1  Aug. 30, 2018

Related U.S. Application Data

(63) Continuation of application No. PCT/EP2016/067940, filed on Jul. 27, 2016.

(30) Foreign Application Priority Data

Aug. 21, 2015 (DE) .................. 10 2015 216 055

(51) Int. Cl.
*H02K 7/08* (2006.01)
*H02K 9/19* (2006.01)
(Continued)

(52) U.S. Cl.
CPC ................ *H02K 5/20* (2013.01); *H02K 5/15* (2013.01); *H02K 9/19* (2013.01); *H02K 11/33* (2016.01)

(58) Field of Classification Search
CPC . H02K 5/20; H02K 11/33; H02K 5/15; H02K 9/19
(Continued)

(56) References Cited

U.S. PATENT DOCUMENTS 6,160,332 A    12/2000  Tsuruhara
6,879,069 B1*  4/2005  Weidman .............. H02K 1/32
                                                          310/54
(Continued)

FOREIGN PATENT DOCUMENTS

CN    201393138 Y    1/2010
CN    201533219 U    7/2010
(Continued)

OTHER PUBLICATIONS

International Search Report and Written Opinion dated Oct. 7, 2018 from corresponding International Patent Application No. PCT/EP2016/067940.
(Continued)

*Primary Examiner* — Naishadh N Desai (57) ABSTRACT

A cooling system for an electric machine is disclosed. The cooling system includes at least one bearing bracket and at least one coolant distributor plate. The bearing bracket and the coolant distributor plate are designed to jointly form a cooling channel. The cooling channel includes multiple horizontal cooling channel sections which run parallel to an axis of rotation of the electric machine, multiple vertical cooling channel sections which run perpendicular to the axis of rotation of the electric machine, and multiple radial cooling channel sections which run around the axis of rotation of the electric machine. The three different cooling channel sections adjoin one another such that the cooling channel has a three-dimensional meandering profile at least in regions.

15 Claims, 6 Drawing Sheets

(51) Int. Cl.
*H02K 5/20* (2006.01)
*H02K 5/15* (2006.01)
*H02K 11/33* (2016.01)

(58) Field of Classification Search
USPC .................. 310/89, 90, 91, 400–423, 52–64
See application file for complete search history.

(56) References Cited

U.S. PATENT DOCUMENTS

| | | | |
|---|---|---|---|
| 8,080,909 B2 | 12/2011 | Perkins | |
| 2002/0070560 A1* | 6/2002 | Hylton | F03B 3/02 |
| | | | 290/52 |
| 2006/0163962 A1* | 7/2006 | Shimada | B23Q 1/70 |
| | | | 310/90.5 |
| 2008/0024020 A1* | 1/2008 | Iund | H02K 5/20 |
| | | | 310/61 |
| 2011/0304226 A1 | 12/2011 | Bradfield | |
| 2014/0354089 A1* | 12/2014 | Chamberlin | H02K 9/19 |
| | | | 310/54 |

FOREIGN PATENT DOCUMENTS

| | | |
|---|---|---|
| CN | 101895172 A | 11/2010 |
| CN | 103166377 A | 6/2013 |
| CN | 202997796 U | 6/2013 |
| CN | 103261705 A | 8/2013 |
| CN | 103812270 A | 5/2014 |
| CN | 103814515 A | 5/2014 |
| DE | 20317814 U1 | 2/2004 |
| DE | 102005002897 A1 | 11/2005 |
| DE | 102007035271 A1 | 1/2009 |
| DE | 102012023525 A1 | 6/2013 |
| DE | 212011100216 U1 | 5/2014 |
| DE | 112012003901 T5 | 8/2014 |
| EP | 2479874 A1 | 7/2012 |
| EP | 2731236 A2 | 5/2014 |
| FR | 2999359 A1 | 6/2014 |
| JP | S60-05260 | 1/1985 |
| JP | S6172063 A | 4/1986 |
| JP | H07298552 A | 11/1995 |
| JP | 2002186215 A | 6/2002 |
| JP | 2004007874 A | 1/2004 |
| JP | 2010004694 A | 1/2010 |
| KR | 100259799 B1 | 6/2000 |
| WO | 2009015946 A1 | 2/2009 |

OTHER PUBLICATIONS

German Office Action dated Apr. 29, 2016 for corresponding German Patent Application No. 10 2015 216 055.6.
Chinese Office Action dated Mar. 29, 2019 for corresponding Chinese application No. 201680042721.6.
Japanese Office Action dated Mar. 25, 2019 for corresponding Japanese application No. 2018-509781.
Korean first Office Action dated Nov. 21, 2018 for corresponding Korean application No. 10-2018-7005023.
Korean second Office Action dated May 29, 2019 for corresponding Korean application No. 10-2018-7005023.
Chinese Second dated Aug. 28,2019 issued by the Patent Office of SIPO of P.R.C. for corresponding Chinese Invention Application No.: 201680042721.6.

* cited by examiner

COOLING SYSTEM FOR AN ELECTRIC MACHINE

CROSS-REFERENCE TO RELATED APPLICATIONS

This application claims the benefit of PCT Application PCT/EP2016/067940, filed Jul. 27, 2016, which claims priority to German Application DE 10 2015 216 055.6, filed Aug. 21, 2015. The disclosures of the above applications are incorporated herein by reference.

TECHNICAL FIELD

The disclosure relates to a cooling system for an electric machine, for example, an electric motor, such as an asynchronous motor or a synchronous motor.

BACKGROUND

Such electric machines are required for a wide variety of drive tasks, and generate heat losses during the operation thereof due to electrical losses such as eddy-current losses or copper losses. In electric machines, one power-limiting factor is the quality of the dissipation of the generated heat losses. In particular in the case of designs in which parts subjected to high temperatures within the electric machine are not directly cooled by a cooling medium, utilization of an active mass that is used is under some circumstances not optimal. Special zones in which a dissipation of heat within an electric machine may be problematic are in particular stator winding heads and a rotor of the electric machine.

It is known for electric machines to be cooled using a gaseous or liquid medium. Air is typically used as gaseous medium, and water is typically used as liquid medium, where, in the case of liquid-type cooling, electric machines are normally cooled by a cooling jacket. Electric machines may furthermore be self-cooled or externally cooled.

SUMMARY

The current disclosure provides a cooling system that permits improved cooling of the electric machine, for example, of the winding heads thereof.

The cooling system for an electric machine according to the disclosure includes at least one bearing bracket and at least one coolant distributor plate. The bearing bracket and the coolant distributor plate are designed to jointly form a cooling channel. The cooling channel includes, in each case, multiple differently running cooling channel sections, for example, multiple horizontal cooling channel sections which run parallel to an axis of rotation of the electric machine, multiple vertical cooling channel sections which run perpendicular to the axis of rotation of the electric machine, and multiple radial cooling channel sections which run around the axis of rotation of the electric machine. The three different cooling channel sections adjoin one another such that the cooling channel has a three-dimensionally meandering profile at least in regions.

Implementations of the disclosure may include one or more of the following optional features. In some implementations, the three-dimensionally meandering profile may be realized for example by the following sequence of the different cooling channel sections: a first radial cooling section runs, for example as viewed radially in the region of a rotor of the electric machine, a certain distance around the axis of rotation and transitions into a first vertical section, which runs radially outward for example as far as a winding head region of the stator and transitions into a first horizontal cooling section, which extends for example in an axial direction of the winding heads. The horizontal section transitions into a second radial cooling section, which runs, radially and axially offset with respect to the first radial cooling section, a certain distance around the axis of rotation and transitions into a second axial cooling section, which runs parallel and in the opposite direction to the first axial cooling section. The second axial cooling section transitions into a second vertical cooling section, which runs parallel and in the opposite direction to the first vertical cooling section. As such, a section or a loop of a three-dimensional meandering pattern is formed, which meandering pattern can be formed by stringing such sections or loops together. Such a meandering pattern extends, for example, over the full circumference or over almost the full circumference, that is to say, in the assembled state of coolant distributor plate and bearing bracket, a three-dimensionally radially encircling meandering cooling channel is realized, which is formed by horizontal, vertical and radial cooling channel sections. A cooling medium, for example oil, water or glycol, can be conducted through the cooling channel. The use of other cooling fluids or cooling liquids is however also provided for.

The meandering profile of the cooling channel allows for cooling to be generated in the region of a stator winding head, which cooling acts both parallel to the axis of rotation and around the axis of rotation and in the circumferential direction of the winding head. The cooling system according to the disclosure makes it possible, for example, for heat losses that are generated in the region of a stator winding head as a hotspot to be able to be dissipated effectively. The hotspots as critical hot points can thus be cooled, as it were, at the location at which they arise. Since the cooling system according to the disclosure makes it possible for heat to be dissipated in targeted fashion from the region of a stator winding head and of the rotor, the power of the machine to be cooled may be increased with an unchanged structural volume.

Since the cooling channel can be generated as a result of a process of assembly of bearing bracket and coolant distributor plate, the outlay for the assembly and manufacture of the electric machine can be reduced. Since the cooling channels do not have to be produced in one working step, for example in a permanent mold casting process, it is possible, for series manufacturing, to use relatively inexpensive manufacturing methods, for example pressure die casting and extrusion, without reworking such as for example drilling or milling work. Furthermore, although the cooling channels are based on a particularly simple construction of bearing bracket and coolant distributor plate, they nevertheless ensure optimum cooling of the winding heads and of the electric machine, where a greater power yield can be achieved.

In some examples, it is provided that vertical webs and axial webs project into the cooling channel, where the vertical webs and the axial webs alternate around the axis of rotation of the electric machine with a spacing to one another and are designed to conduct a cooling medium within the cooling channel. In other words, the webs project into the cooling channel such that a cooling medium flowing through the cooling channel is diverted in an axial direction and in a vertical direction. For example, the bearing bracket may have the axial webs and the coolant distributor plate may have the axial webs, or vice versa, in order to realize a corresponding channel configuration and diversion in the assembled state of the electric machine.

It is thus possible, for example by axial webs of the coolant distributor plate and vertical webs of the bearing bracket in the cooling channel, for a meandering three-dimensional cooling channel to be formed. Due to axial and vertical webs being arranged in each case alternately in the radial direction in the cooling channel and being arranged offset with respect to one another in the radial direction, a channel is formed in which the cooling medium flows substantially in a radial direction from a feed port at a first end of the cooling channel to a discharge port at a second end of the cooling channel situated opposite the first end, and is diverted through approximately 180° in terms of its movement direction at the ends of the webs.

Furthermore, axial webs of the coolant distributor plate may engage into corresponding depressions of the bearing bracket and vice versa.

Furthermore, at least one transverse rib may be arranged in the cooling channel. The transverse rib effects a narrowing of the flow cross section within the cooling channel. It is thus made possible for a cooling medium within the cooling channel to be able to flow more quickly, and mix more intensely, in the region of the transverse rib, which can lead to positive influencing of a boundary layer which impedes the heat transfer, by virtue of a reduction of the thickness of the Prandtl boundary layer being made possible. Furthermore, the transverse ribs enlarge a potential heat transfer exchange surface.

A transfer of heat by convection takes place generally as a result of hot molecules of a fluid being led to a surface. In this process, there must be a constant follow-up feed of new molecules in order that an exchange of heat can take place. The more energetic the movement of a fluid is, the greater the heat transfer by convection also is. An aim of an optimization of the heat transfer by convection is therefore to turn a laminar flow into permanently turbulent flows. In any flow, fluid particles remain adhered to the wall. Other particles slide along on the former particles, such that no particles can release heat to the wall transversely with respect to the flow direction. This is then a purely laminar flow. The heat transfer occurs only by heat conduction. With the arrangement of turbulators or transverse ribs within the cooling channel, although gas particles again remain immovably adhered to the wall, it is also the case, depending on the vortex formation, that particles move transversely with respect to the flow direction and bring particles to the thin boundary layer for the exchange of heat. The flow is then turbulent, and the heat transfer increases with increasing turbulence.

Furthermore, at least one longitudinal rib may be arranged in the cooling channel. Furthermore, the cooling channel may have a roughened surface at least in regions. These two examples permit an enlargement of the potential heat transfer exchange surface.

It is furthermore provided that an inverter housing bears against the coolant distributor plate. A corresponding communication of cooling medium in the cooling channel sections of the cooling channel achieves uniform efficient cooling of the bearing bracket and of the inverter housing. Since the cooling channel is led in three-dimensional fashion, the winding head may be cooled in encircling fashion, and an interface between bearing bracket and inverter housing, with a radial ball bearing, on the one hand, and control and power electronics, on the other hand, can be cooled over a large area.

In some implementations, two bearing brackets, two coolant distributor plates and a coolant transfer device are provided, where the bearing brackets and coolant distributor plates are arranged in each case on mutually opposite axial sides of the electric machine, specifically on a drive side and on an output side of the electric machine, and the coolant transfer device forms a connecting line for coolant between the coolant distributor plates. During the assembly of bearing bracket, coolant distributor plate and inverter housing on one side and of bearing bracket and coolant distributor plate on the other side of the electric machine, in each case one cooling duct as described above is formed, which may be led in three-dimensionally meandering and encircling fashion around the respective stator winding head. Since the cooling channel is led in three-dimensional fashion, the stator winding head may be cooled in encircling fashion, and the interface between bearing bracket and inverter housing may be cooled in areal fashion.

An electric machine according to the disclosure includes a stator with a stator laminated core, where coil windings with axially protruding winding heads are inserted in the stator laminated core, a rotor with a rotor laminated core seated on a rotor shaft, and an above-described cooling system according to the disclosure.

In some implementations of the electric machine, it is provided that at least one of the winding heads is surrounded with a contact element. The contact element may involve gap filler. This example enables heat to be dissipated from the winding head to a heat sink, for example an actively cooled bearing bracket. The contact element, for example the gap filler, may in this case form a thermal connection of the stator winding heads to the cooling system. After a bearing bracket assembly process, radial and axial outer surfaces of the winding head can bear against one another in respective recesses of the bearing bracket, specifically in particular without air pockets and without play. In this way, a particularly good thermally conductive transition between winding head and actively water-cooled bearing bracket is made possible, and the formation of local hot points in the winding head can thus be greatly reduced.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
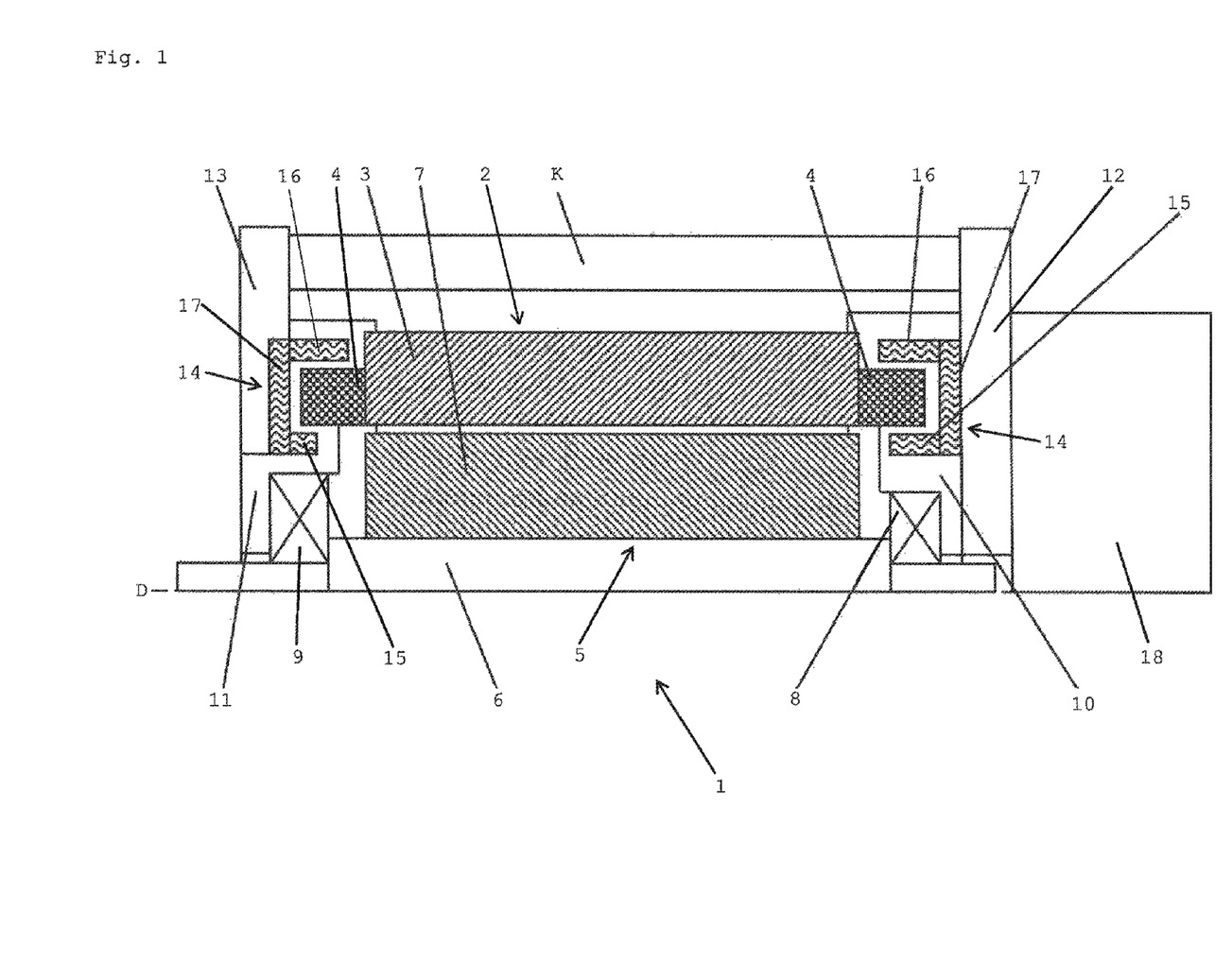
FIG. 1 shows a schematic partial longitudinal sectional illustration of an electric machine with an exemplary cooling circuit.

FIG. 1 shows the upper part of an electric machine 1 that includes a stator 2 with a stator laminated core 3. Coil windings with axially protruding winding heads 4 are inserted in the stator laminated core 3. Furthermore, the stator 2 has a rotor 5 with a rotor laminated core 7 seated on a rotor shaft 6. The rotor shaft 6 is mounted in a first rotor bearing 8 on a drive side, illustrated on the right in FIG. 1, of the electric machine 1, and in a second rotor bearing 9 on an output side, illustrated on the left in FIG. 1, of the electric machine 1. A first bearing bracket 10 fixedly holds the first rotor bearing 8, and a second bearing bracket 11 fixedly holds the second rotor bearing 9. The first bearing bracket 10 is fixedly connected to a first coolant distributor plate 12, and the second bearing bracket 11 is fixedly connected to a second coolant distributor plate 13.

Both the first bearing bracket 10 and the first coolant distributor plate 12 and also the second bearing bracket 11 and the second coolant distributor plate 13 in each case jointly form a cooling channel 14. The cooling channel 14 includes, in each case, multiple horizontal cooling channel sections 15, 16, which run parallel to an axis of rotation D of the electric machine 1, multiple vertical cooling channel sections 17, which run perpendicular to the axis of rotation D of the electric machine 1, and multiple radial cooling channel sections (not shown in FIG. 1), which run around the axis of rotation D of the electric machine 1. The three different cooling channel sections 15 to 17 join one another such that the cooling channel 14 has a three-dimensional meandering profile.

In FIG. 1, in each case, one of several first horizontal cooling channel sections 15 may be seen per cooling channel 14, which first horizontal cooling channel section, as viewed radially, runs in the outer region of the rotor laminated core 7 and in the inner region of the winding head 4, and extends axially along the winding head 4. Furthermore, FIG. 1 shows, in each case, one of several second horizontal cooling channel sections 16 per cooling channel, which second horizontal cooling channel section, as viewed radially, runs further to the outside than the first horizontal cooling channel section 15 and extends axially along an outer circumference of the winding head 4. The first and second cooling channel sections 15, 16 run in the axial direction parallel to the winding head 4 along the first bearing bracket 10, such that the radial inner region and the radially outer region of the winding head can be cooled over a great extent in an axial direction, for example, indirectly via the first bearing bracket and by means of a cooling medium, for example water, oil or glycol, flowing within the cooling channel.

Furthermore, FIG. 1 shows in each case, one of several vertical cooling channel sections 17 per cooling channel 14, which vertical cooling channel section connects the first horizontal cooling channel section 15 to the second horizontal cooling channel section 16. Arranged laterally on the first coolant distributor plate 12 in an axial direction is an inverter housing 18, which accommodates an inverter (not illustrated). The vertical cooling channel sections 17 run such that the winding head can be cooled in a radial direction and the inverter housing 18 can be cooled indirectly via the coolant distributor plate 12. Further cooling channel sections (not illustrated) are arranged in the circumferential direction of the winding head 4, which further cooling channel sections in each case transition into one another and form the three-dimensional meandering form of the cooling channel 14 along a major part of the full circumference of the winding head 4. Furthermore, a coolant transfer device K is arranged between the first coolant distributor plate 12 and the second coolant distributor plate 13 and forms a connecting line for coolant between the coolant distributor plates 12, 13.

Figure 2:
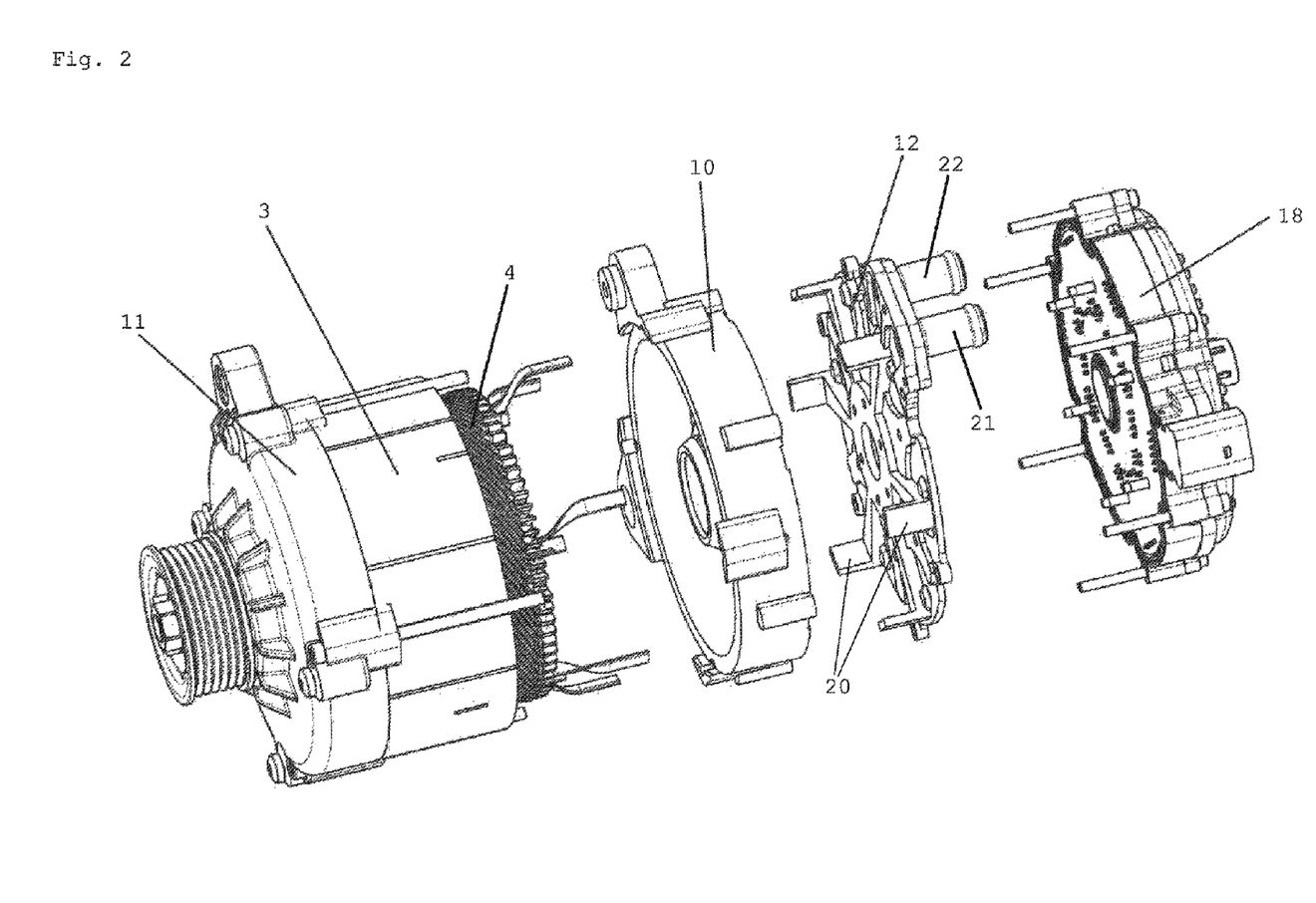
FIG. 2 shows a perspective exploded illustration of a further electric machine with a further exemplary cooling system.
Figure 3:
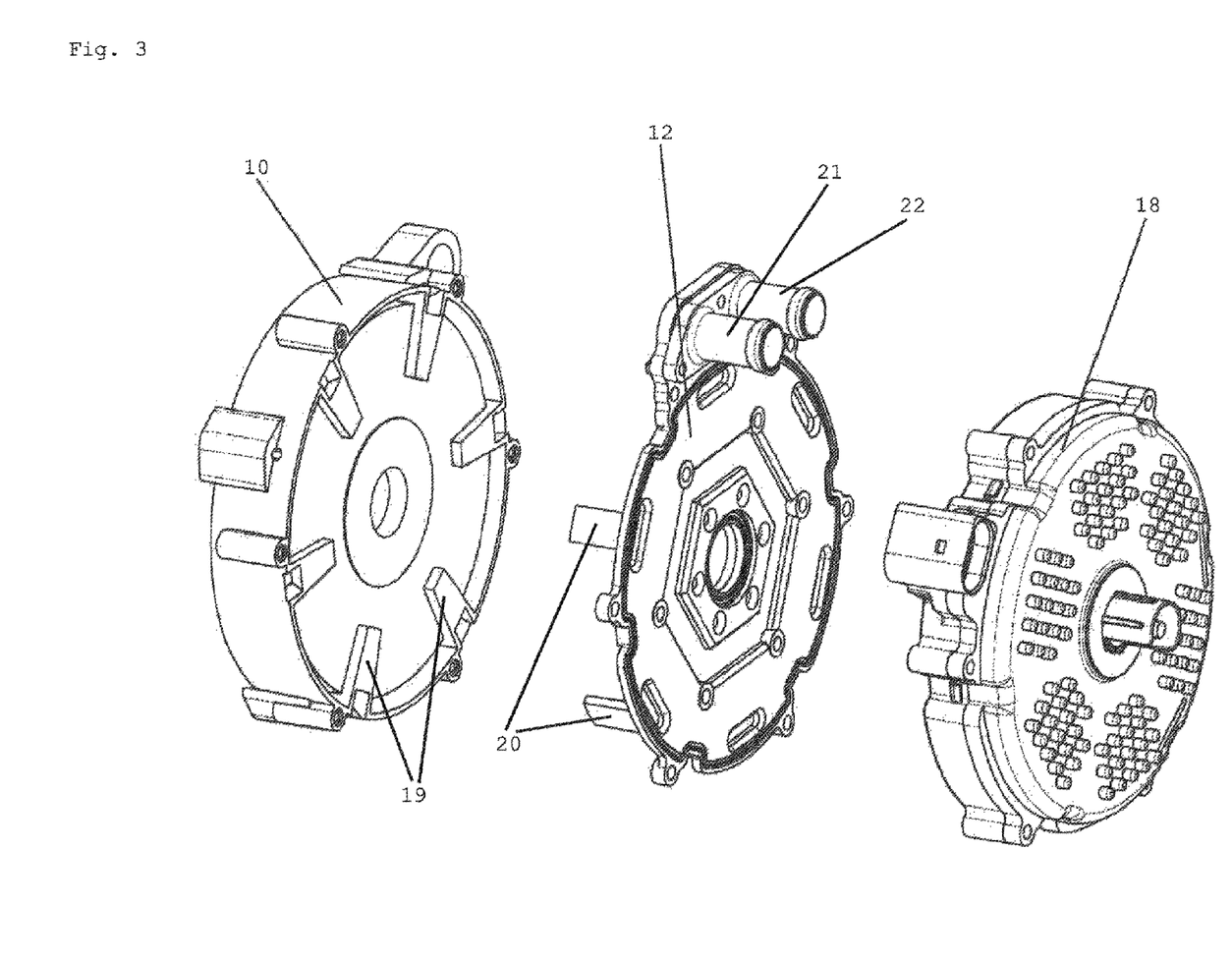
FIG. 3 shows parts of the electric machine as per FIG. 2 in an alternative perspective exploded illustration.

FIGS. 2 to 6 show a further electric machine 1 having, shown from right to left in FIG. 2, an inverter housing 18, a coolant distributor plate 12, a first bearing bracket 10, a winding head 4 of a stator 2, a stator laminated core 3, and a second bearing bracket 11. Vertical webs 19 and axial webs 20 project into a cooling channel formed by the first bearing bracket 10 and the coolant distributor plate 12 in the assembled state of the electric machine, wherein the vertical webs 19 and the axial webs 20 alternate around the axis of rotation D of the electric machine 1 with a spacing to one another and are designed to conduct a cooling medium within the cooling channel.

The axial webs 20 are formed by the coolant distributor plate 12 and the vertical webs 19 are formed by the first bearing bracket 10, and contribute to the formation of a meandering three-dimensional cooling channel. Due to the axial webs 20 and vertical webs 19 being arranged in each case alternately in the radial direction in the cooling channel and being arranged offset with respect to one another in a radial direction, a cooling channel is formed in which the cooling medium flows substantially in a radial direction from a feed port 21 at a first end of the cooling channel to a discharge port 22 at a second end of the cooling channel situated opposite the first end, and is diverted through approximately 180° in terms of its movement direction at the ends of the webs 19, 20. Furthermore, the axial webs 20 of the coolant distributor plate 12 may engage into corresponding depressions 23 of the first bearing bracket 10.

Figure 4:
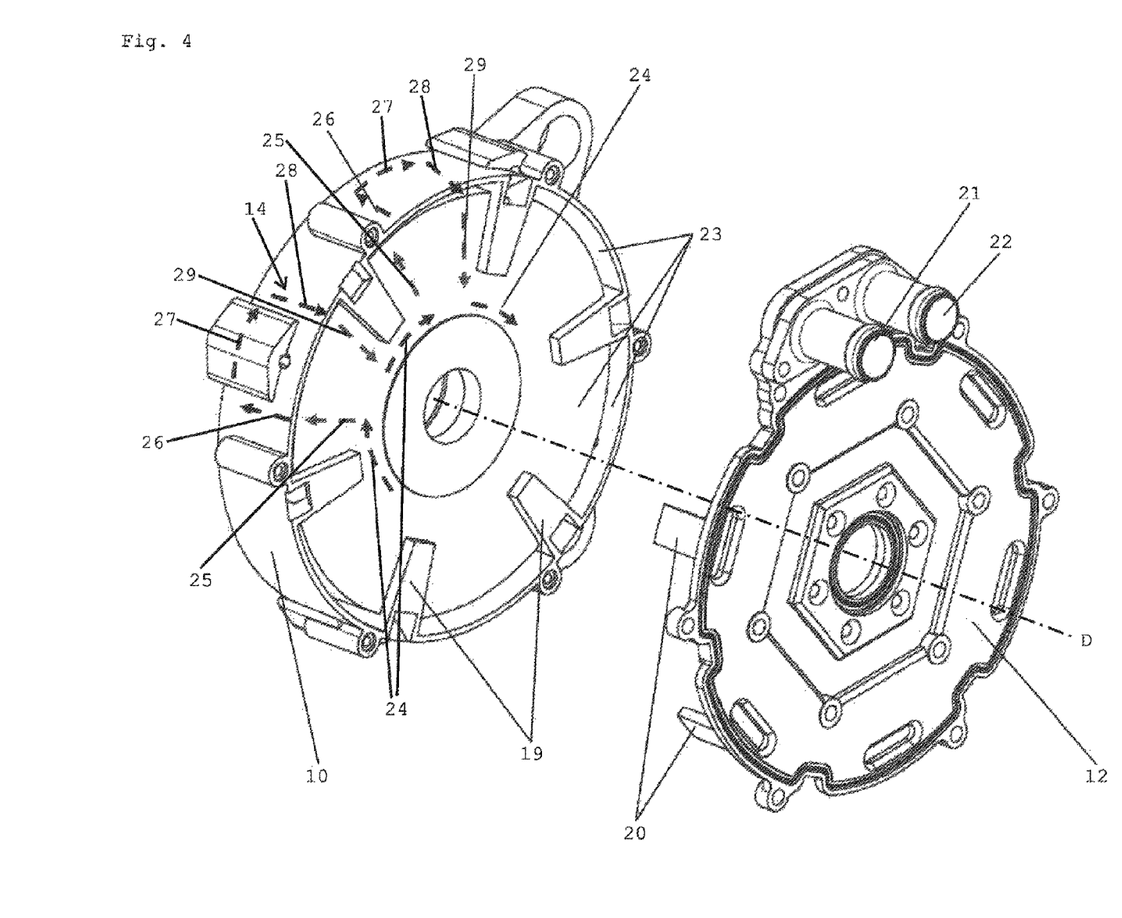
FIG. 4 shows an enlarged perspective view of parts as per FIG. 3, with a cooling channel indicated.
Figure 5:
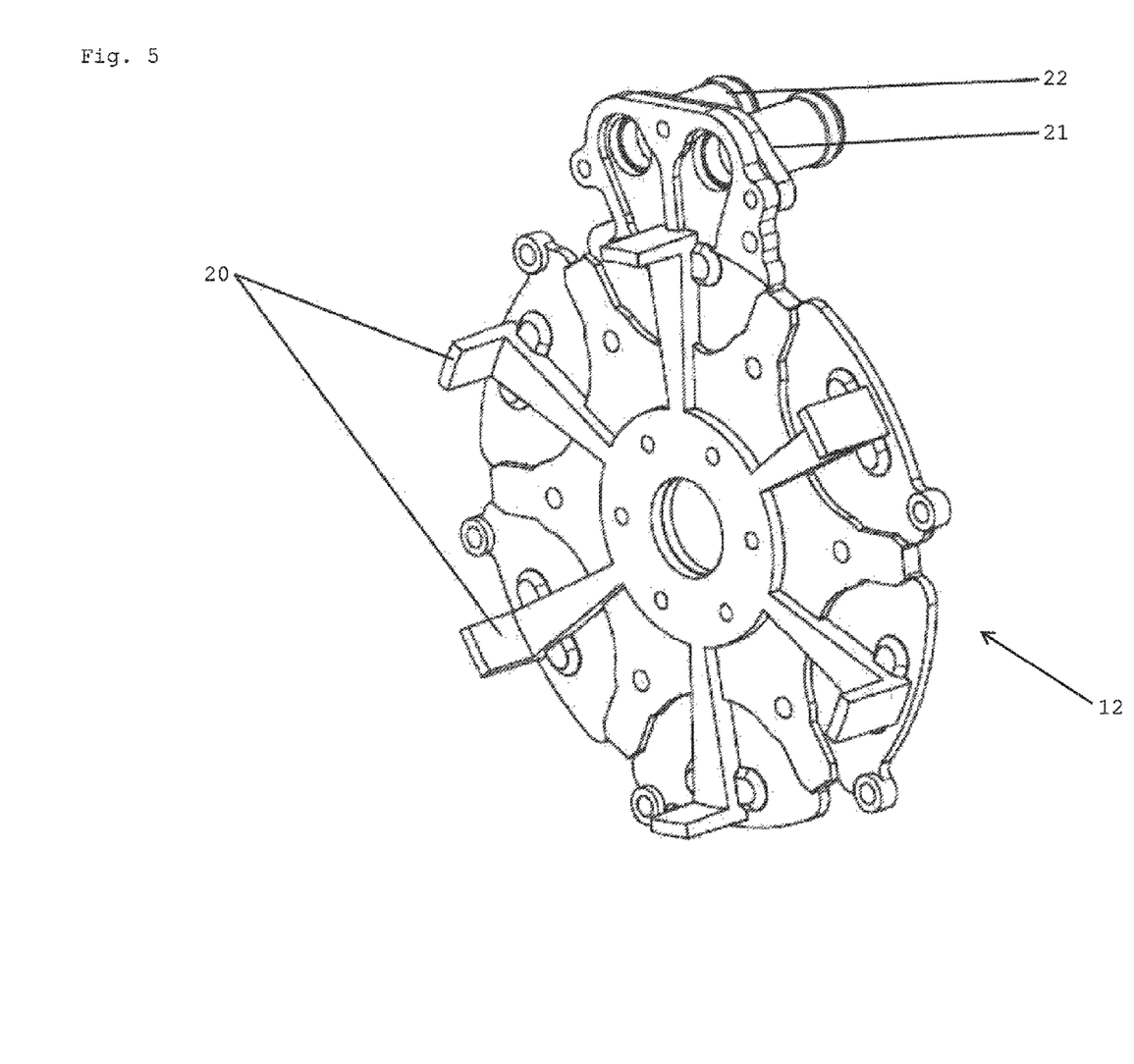
FIG. 5 shows a perspective view of a coolant distributor plate of the electric machine as per FIG. 2.
Figure 6:
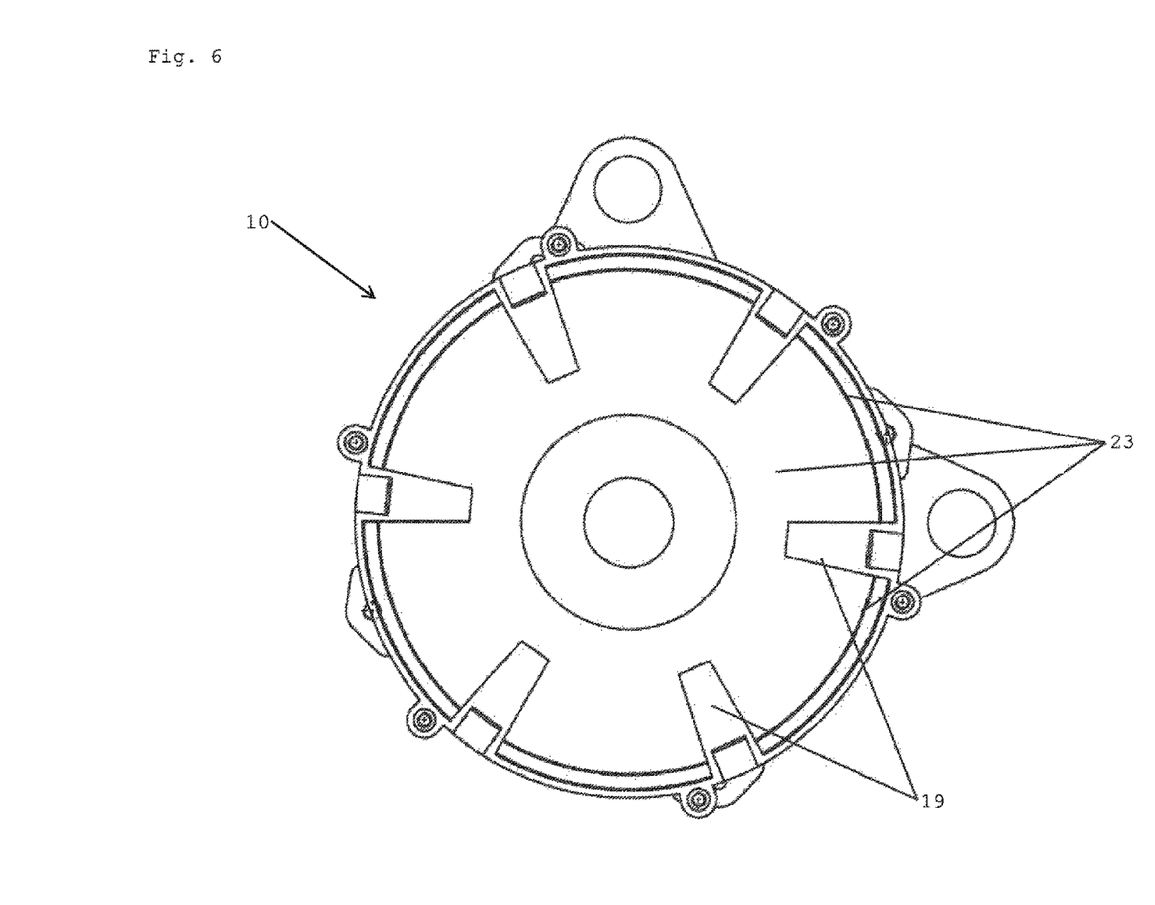
FIG. 6 shows a side view of a bearing bracket of the electric machine as per FIG. 2.

FIG. 4 shows, by way of dashed arrow lines, the profile of the cooling channel 14 which runs in three-dimensionally meandering fashion, and which is formed by the first bearing bracket 10 and the coolant distributor plate 12 in the assembled state thereof. Here, the cooling channel 14 has the following repeating sequence of different cooling channel sections:

A first radial cooling section 24 runs, as viewed radially in the region of a rotor (not shown in FIGS. 2 to 6) of the electric machine 1, a certain distance around the axis of rotation D of the electric machine and transitions into a first vertical cooling channel section 25, which runs radially outward as far as a region of the winding head 4 of the stator 2 and transitions into a first horizontal cooling section 26, which extends for example in an axial direction of the winding heads 4. The horizontal section 26 transitions into a second radial cooling section 27, which runs, radially and axially offset with respect to the first radial cooling section 24, a certain distance around the axis of rotation D and transitions into a second axial cooling section 28, which runs parallel and in the opposite direction to the first axial cooling section 26. The second axial cooling section 28 transitions into a second vertical cooling section 29, which runs parallel and in the opposite direction to the first vertical cooling section 25. As such, a section or a loop of a three-dimensional meandering pattern is formed, which meandering pattern can be formed by stringing such sections or loops together. The meandering pattern extends circumferentially between the feed port 21 and the discharge port 22, that is to say, in the assembled state of coolant distributor plate 12 and first bearing bracket 10, a three-dimensionally radially encircling meandering cooling channel 14 is provided, which is formed by horizontal cooling channel sections 26, 28, vertical cooling channel sections 25, 29 and radial cooling channel sections 24, 27. A cooling medium, for example oil, water or glycol, can be conducted through the cooling channel 14.

A number of implementations have been described. Nevertheless, it will be understood that various modifications may be made without departing from the spirit and scope of the disclosure. Accordingly, other implementations are within the scope of the following claims.

What is claimed is:

1. A cooling system for an electric machine, the cooling system comprising:
   at least one bearing bracket;
   at least one coolant distributor plate; and a cooling channel formed by the at least one bearing bracket and the coolant distributor plate jointly, the cooling channel comprising:
      multiple horizontal cooling channel sections which run parallel to an axis of rotation of the electric machine;
      multiple vertical cooling channel sections which run perpendicular to the axis of rotation of the electric machine; and
      multiple radial cooling channel sections which run around the axis of rotation of the electric machine,
   wherein the three cooling channel sections adjoin one another such that the cooling channel has a three-dimensional meandering profile at least in regions.

2. The cooling system of claim 1, further comprising vertical webs and axial webs project into the cooling channel, wherein the vertical webs and the axial webs alternate around the axis of rotation of the electric machine with a spacing to one another and are designed to conduct a cooling medium within the cooling channel.

3. The cooling system of claim 1, wherein at least one transverse rib is arranged in the cooling channel.

4. The cooling system of claim 1, wherein at least one longitudinal rib is arranged in the cooling channel.

5. The cooling system of claim 1, wherein the cooling channel has a roughened surface at least in regions.

6. The cooling system of claim 1, wherein an inverter housing bears against the coolant distributor plate.

7. The cooling system of claim 1, further comprising:
   two bearing brackets;
   two coolant distributor plates; and
   a coolant transfer device;
   wherein the bearing brackets and coolant distributor plates are arranged on mutually opposite axial sides of the electric machine, and the coolant transfer device forms a connecting line for coolant between the coolant distributor plates.

8. An electric machine comprising:
   a stator with a stator laminated core, wherein coil windings with axially protruding winding heads are inserted in the stator laminated core;
   a rotor with a rotor laminated core seated on a rotor shaft; and
   a cooling system comprising:
      at least one bearing bracket;
      at least one coolant distributor plate; and a cooling channel formed by the at least one bearing bracket and the coolant distributor plate jointly, the cooling channel comprising:
         multiple horizontal cooling channel sections which run parallel to an axis of rotation of the electric machine;
         multiple vertical cooling channel sections which run perpendicular to the axis of rotation of the electric machine; and
         multiple radial cooling channel sections which run around the axis of rotation of the electric machine,
      wherein the three cooling channel sections adjoin one another such that the cooling channel has a three-dimensional meandering profile at least in regions.

9. The electric machine of claim 8, wherein at least one of the winding heads is surrounded by a contact element.

10. The electric machine of claim 8, wherein the cooling system further comprises vertical webs and axial webs project into the cooling channel, wherein the vertical webs and the axial webs alternate around the axis of rotation of the electric machine with a spacing to one another and are designed to conduct a cooling medium within the cooling channel.

11. The electric machine of claim 8, wherein at least one transverse rib is arranged in the cooling channel.

12. The electric machine of claim 8, wherein at least one longitudinal rib is arranged in the cooling channel.

13. The electric machine of claim 8, wherein the cooling channel has a roughened surface at least in regions.

14. The electric machine of claim 8, wherein an inverter housing bears against the coolant distributor plate.

15. The electric machine of claim 8, wherein the cooling system further comprises:
   two bearing brackets;
   two coolant distributor plates; and
   a coolant transfer device;
   wherein the bearing brackets and coolant distributor plates are arranged on mutually opposite axial sides of the electric machine, and the coolant transfer device forms a connecting line for coolant between the coolant distributor plates.

* * * * *